United States Patent
Abele et al.

(12)

(10) Patent No.: US 6,387,166 B1
(45) Date of Patent: May 14, 2002

(54) POLISHES COMPRISING AMINOORGANOPOLYSILOXANES CONTAINING FLUORO GROUPS

(75) Inventors: Bors C. Abele; Günter Mahr; Jörn Winterfeld; Franz Wimmer; Anton Spannbrucker, all of Burghausen (DE)

(73) Assignee: Wacker-Chemie GmbH, Munich (DE)

( * ) Notice: Subject to any disclaimer, the term of this patent is extended or adjusted under 35 U.S.C. 154(b) by 0 days.

(21) Appl. No.: 09/574,039

(22) Filed: May 18, 2000

(30) Foreign Application Priority Data

May 21, 1999 (DE) ......................... 199 23 477

(51) Int. Cl.$^7$ ............................. C09G 1/16
(52) U.S. Cl. ............... 106/3; 106/287.11; 106/287.13; 106/287.14; 556/218.8
(58) Field of Search ............... 556/488; 106/3, 106/287.11, 287.13, 287.14

(56) References Cited

U.S. PATENT DOCUMENTS 5,705,592 A * 1/1998 Sejpka et al. ............... 528/42

FOREIGN PATENT DOCUMENTS

| DE | 36 13 384 C1 | 1/1988 |
|----|----|----|
| DE | 36 35 093 C1 | 3/1988 |
| DE | 195 39 340 A1 | 4/1997 |
| DE | 196 34 832 A1 | 3/1998 |
| DE | 19634832 A1 * | 3/1998 |
| EP | 0 882 766 A2 | 12/1998 |
| JP | 3-227383 | 10/1991 |
| JP | 4-202389 | 7/1992 |
| WO | WO 96/19562 | 6/1996 |
| WO | WO 96/26260 | 8/1996 |

* cited by examiner

Primary Examiner—C. Melissa Koslow
(74) Attorney, Agent, or Firm—Brooks & Kushman P.C.

(57) ABSTRACT

The present invention provides polishes for surfaces, comprising aminoorganopolysiloxanes (A) which are solid at room temperature, contain fluoro groups and are able to change their aggregate state reversibly as a result of changes in temperature.

19 Claims, No Drawings

POLISHES COMPRISING AMINOORGANOPOLYSILOXANES CONTAINING FLUORO GROUPS

TECHNICAL FIELD

The invention relates to polishes for surfaces, comprising aminoorganopolysiloxanes which are solid at room temperature, contain fluoro groups, and are able to change their aggregate state reversibly as a result of changes in temperature.

BACKGROUND ART

Fluoroorganopolysiloxane-based polishes for hard surfaces, such as for automobile bodies, are already known. Reference may be made here, for example, to JP-A-4202389, which describes a polish obtained by dispersing in water, a fluorinated organopolysiloxane synthesized by reacting a hydroxyl-containing methyltrifluoropropylsiloxane having a fluorine content of from 0.1 to 26.5% by weight with a dimethylsiloxane crosslinked with a silicon alkoxide, and a wax or waxlike substance. The fluorinated organopolysiloxane is a solid, branched silicone rubber whose aggregate state is no longer reversible.

JP-A-3227383 describes a polish comprising trimethylsilyl-blocked polymethyl(trifluoropropyl)siloxane and waxes such as carnauba wax 12, Hoechst wax PE 1303 and MINK 5, and an aliphatic solvent. The fluorinated organopolysiloxane is a liquid siloxane which, due to its aggregate state, is readily removable by washing and/or reemulsification.

DE-A-3635093 describes the preparation of fluorine-containing siloxanes by reacting fluoro-containing alcohols with siloxanes containing Si—H moieties. The products thus prepared, however, have the disadvantage that owing to the thus formed Si—O—C linkage, they react in aqueous systems to form silanols, which then polymerize by condensation. As a further cleavage product, the fluoro-containing alcohol used is also obtained. DE-A-3635093 further discloses the preparation of fluoro-containing products by reaction of Si—H components with corresponding fluoro-containing olefins as being the state of the art.

The known fluorine-containing organopolysiloxanes are, if in liquid form, reemulsifiable or able to be washed away by water. If these organopolysiloxanes are crosslinked, i.e., are in the form of a silicone rubber, they can no longer change their aggregate state, which makes them very difficult to apply, since they cannot be refluidized by the frictional heat produced during their application.

Oleophobicizing polishes based on fluorinated organopolysiloxanes solid at room temperature are known from DE 195 39 940 A1. The compounds prepared in the manner described therein, using transition metals such as platinum and derivatives thereof, are gray and, as a result, exhibit disadvantages in performance tests, since the preference is for solely white compounds.

Disclosure of Invention

An object of the present invention is to provide polishes which exhibit good hydrophobicization in conjunction with good oleophobicization, and which do not have any gray coloration. These and other objects are achieved by the invention.

Best Mode for Carrying Out the Invention

The present invention provides polishes for surfaces, comprising aminoorganopolysiloxanes (A) which are solid at room temperature, contain fluoro groups, and are able to change their aggregate state reversibly as a result of changes in temperature. Reversible changing of the aggregate state means that the solid aggregate state changes reversibly to the liquid aggregate state, and vice versa.

The aminoorganopolysiloxanes (A) are pure white, since a judicious mode of preparation makes it possible to do without transition metal catalysts. The polishes exhibit high weathering stability and wash resistance and are distinguished by an oleophobic character. The aminoorganopolysiloxanes (A) adhere durably to the substrate.

The aminoorganopolysiloxanes (A) are preferably waxlike compounds which meet one or more of the following criteria:

The liquidity point or melting point is at least 20° C., preferably at least 40° C. and not more than 60° C., and more preferably not more than 50° C. at 1000 hPa;

The melt viscosity is not more than 10,000 mPa·s, preferably not more than 8000 mPa·s, when measured at 10° C. above the liquidity point;

The compounds are polishable under gentle pressure;

The compounds exhibit pronounced dependence of solubility and consistency with respect to temperature;

At 20° C., the compounds are kneadable or hard and fragile, amorphous to finely crystalline but not glasslike, highly viscous or liquid;

The compounds are meltable without decomposition;

Above the melting point, the compound's viscosity exhibits a pronounced negative temperature dependence;

The liquid aminoorganopolysiloxane (A) has no tendency toward stringiness; and

The aminoorganopolysiloxane (A) can form pastes or gels.

The polishes preferably contain no organic solvent. However, they may include small amounts, such as up to a maximum of 2% by weight, for example, based on the overall weight of the polish, of an organic solvent which functions, for instance, as a preservative. In principle, however, systems based primarily on organic solvents are also provided by the invention.

In the text below, room temperature should be understood to mean a temperature of 20° C.

Aminoorganopolysiloxanes (A) are preferably those comprising units of the general formula I

$$A_a R_b SiX_c O_{(4-a-b-c)/2} \tag{I}$$

where

R can be identical or different and is a monovalent, unsubstituted or substituted hydrocarbon radical having 1 to 40 carbon atoms, X is identical or different and is a chlorine atom or a radical of the formula —OR$^1$ where R$^1$ is hydrogen atom or an alkyl radical having 1 to 8 carbon atoms, which can be substituted by ether oxygen atoms, or is a radical of the general formula (II)

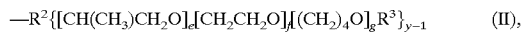

$$-R^2\{[CH(CH_3)CH_2O]_e[CH_2CH_2O]_f[(CH_2)_4O]_g R^3\}_{y-1} \tag{II},$$

where

R$^2$ is a divalent, trivalent or tetravalent hydrocarbon radical having 2 to 30 carbon atoms which can be interrupted by oxygen atoms and is substituted by one or more groups of the formulae —C(O)—O—, —C(O)—NR³—, —SO₂—NR³—, —NR³—, —N= and —S— y in accordance with the valence of radical $R^2$ is 2, 3 or 4, $R^3$ is a hydrogen atom or a hydrocarbon radical which has 1 to 40 carbon atoms and is unsubstituted or substituted by a group —C(O), and e, f and g in each case, independently of one another, are 0 or an integer from 1 to 200, with the proviso that the sum e+f+g is $\geq 1$, A is a radical of the general formula III $$-R^4\{-C_nF_{2n+1}\}_{y-1} \quad (III),$$

where $R^4$ has a definition stated for $R^2$, y in accordance with the valency of radical $R^4$ is 2, 3 or 4 and n is a number from 1 to 40, a is 0, 1 or 2, b is 0, 1, 2 or 3, and c is 0, 1, 2 or 3, with the proviso that the sum a+b+c is $\leq 4$ and aminoorganopolysiloxane (A) has at least one radical A per molecule.

The aminoorganopolysiloxanes (A) preferably consist of units of the general formula (I). As stated by the description of the subject invention compounds as aminoorganopolysiloxanes, the aminoorganopolysiloxanes must contain minimally one aminoorgano group.

The average value of a is preferably from 0.001 to 1.0, with particular preference from 0.01 to 0.5. The average value of b is preferably from 0 to 3.0, with particular preference from 0.2 to 2.5. The average value of c is preferably from 0 to 3.0, with particular preference from 0 to 2.

The aminoorganopolysiloxanes (A) preferably possess an average molecular weight of from 400 to 1,000,000 g/mol, with particular preference from 500 to 150,000 g/mol, and a viscosity at 60° C. of preferably from 10 to 1,000,000 mm²/s, with particular preference from 20 to 100,000 mm²/s. At room temperature, i.e., at 20° C., the compounds in question are solids.

Examples of radicals R are alkyl radicals such as the methyl, ethyl, n-propyl, iso-propyl, 1-n-butyl, 2-n-butyl, iso-butyl, tert-butyl, n-pentyl, iso-pentyl, neo-pentyl, and tert-pentyl radicals; hexyl radicals such as the n-hexyl radical; heptyl radicals, such as the n-heptyl radical; octyl radicals such as the n-octyl radical and iso-octyl radicals such as 2,2,2-trimethylphenyl radical; nonyl radicals such as the n-nonyl radical; decyl radicals such as the n-decyl radical; octadecyl radicals such as the n-octadecyl radical, cycloalkyl radicals such as the cyclopentyl, cyclohexyl, cycloheptyl radical and methylcyclohexyl radicals; alkenyl radicals such as the vinyl, allyl, 3-butenyl, 5-hexenyl, 1-propenyl and 1-pentenyl radicals; alkynyl radicals such as the ethynyl, propargyl and 1-propynyl radicals; aryl radicals such as the phenyl, naphthyl, anthryl and phenanthryl radicals; alkaryl radicals such as o-, m-, and p-tosyl radicals, xylyl radicals and ethylphenyl radicals; and aralkyl radicals such as the benzyl radical, the phenylethyl radical and the phenylnonyl radical.

Examples of substituted hydrocarbon radicals R are haloalkyl radicals, such as the 3,3,3-trifluoro-n-propyl radical, the 2,2,2,2',2',2'-hexafluoroisopropyl radical, the heptafluoroisopropyl radical and haloaryl radicals, such as the o-, m- and p-chlorophenyl radical.

The radical R preferably comprises hydrocarbon radicals having 1 to 18 carbon atoms which are unsubstituted or substituted by halogen, amine, mercapto or ammonium groups, particular preference being given to the methyl, the n-octyl, the n-dodecyl and the n-octadecyl radical.

Examples of alkyl radicals $R^1$ are the alkyl radicals having up to 8 carbon atoms stated for radical R, and also the methoxyethyl and ethoxyethyl radicals.

The radical $R^1$ is preferably a hydrogen atom or a methyl, ethyl, butyl or propyl group, especially a methyl or ethyl group.

Examples of radicals $R^2$ are

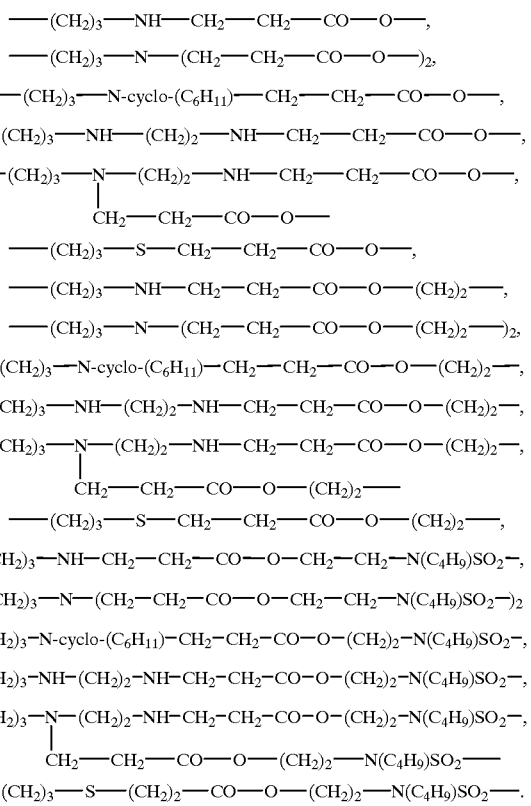

Further examples are compounds containing the function —NH—CH₂—CH(CH₃)—CO—O— instead of function —NH—CH₂—CH₂—CO—O—.

Radical $R^2$ is preferably

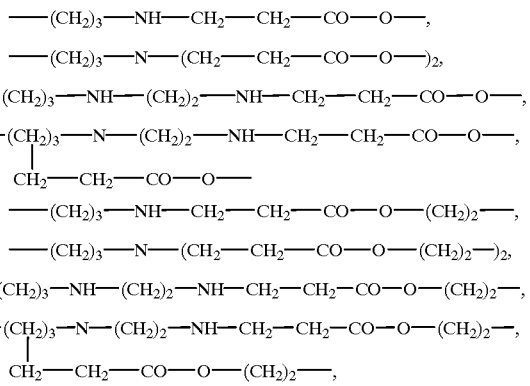

—(CH$_2$)$_3$—NH—CH$_2$—CH$_2$—CO—O—CH$_2$—CH$_2$—N(C$_4$H$_9$)SO$_2$—,

—(CH$_2$)$_3$—N—(CH$_2$—CH$_2$—CO—O—CH$_2$—CH$_2$—N(C$_4$H$_9$)SO$_2$—)$_2$,

—(CH$_2$)$_3$—NH—(CH$_2$)$_2$—NH—CH$_2$—CH$_2$—CO—O—(CH$_2$)$_2$—N(C$_4$H$_9$)SO$_2$—,

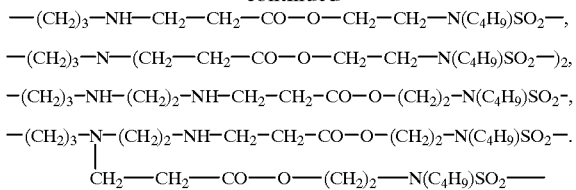

Examples of radicals R$^3$ are hydrocarbon radicals having 1–20 carbon atoms stated for radical R and also —CO—CH$_3$, —CO—CH$_2$—CH$_3$ and —CO—CH$_2$—CH$_2$—CH$_3$. The radical R$^3$ is preferably a hydrogen atom or a methyl or butyl group.

Examples of X as radicals of the general formula (II) are

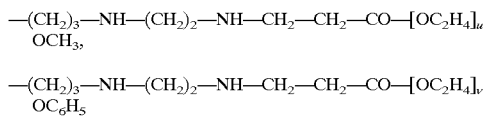

and

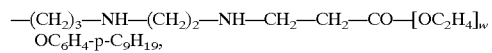

where u, v and w independently of one another are integers from 4 to 20, in particular from 6 to 15.

Radicals of the general formula (II) are preferably

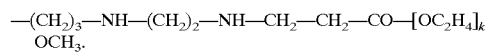

The value of the sum e+f+g is preferably between 2 and 30, with particular preference between 4 and 20. X is preferably the radical —OR$^1$ where R$^1$ is as defined above, particular preference being given to —OCH$_3$ and —OC$_2$H$_5$.

Examples of radicals R$^4$ are the examples stated for radical R$^2$.

n is preferably 2, 4, 6, 8, 10, 12, 18 or 20, with particular preference given to 8, 10 and 12.

The radical A is preferably

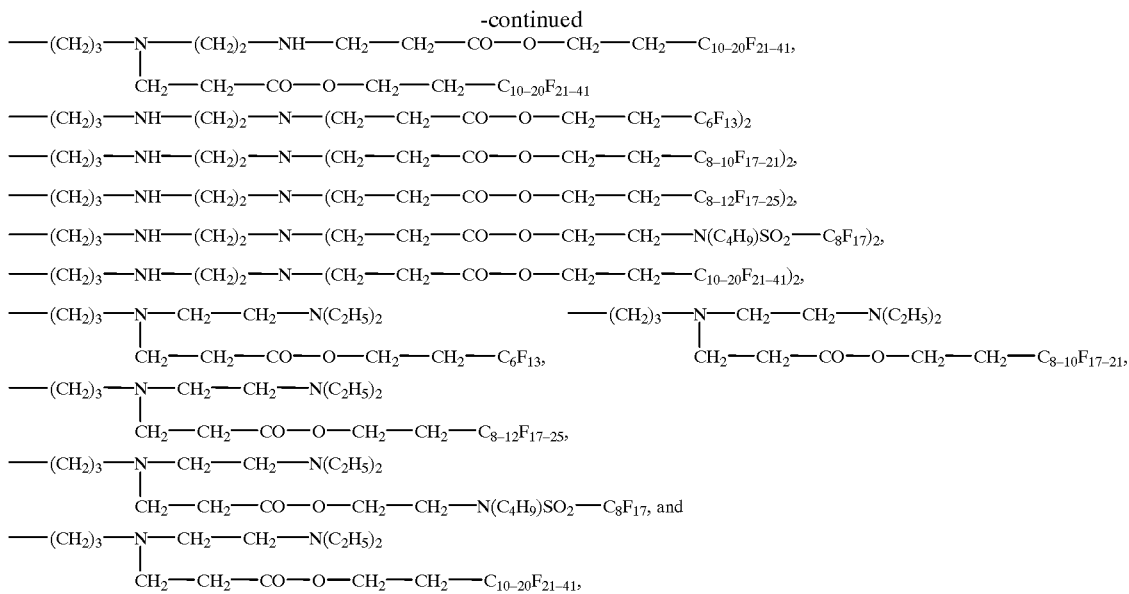

particular preference being given to

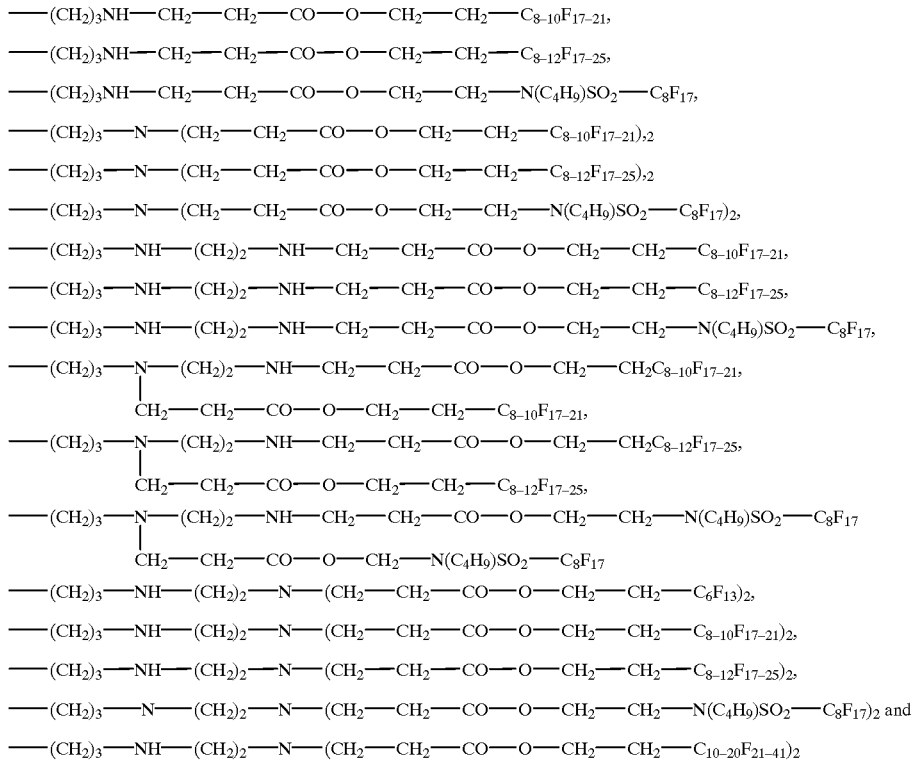

Furthermore, instead of compounds with the function —NH—CH$_2$—CH$_2$—CO—O—, it is also possible for the corresponding compounds having the function —NH—CH$_2$—CH(CH$_3$)—CO—O— to be present, e.g., —(CH$_2$)$_3$—NH—CH$_2$—CH(CH$_3$)—CO—O—CH$_2$—CH$_2$—C$_{6-10}$F$_{13-21}$.

The aminoorganopolysiloxane (A) is preferably of the general formula

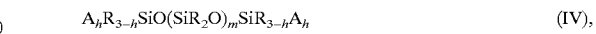

where

A and R have the definition stated above for them, h is 0, 1 or 2, and m and o are each 0 or an integer from 1 to 1000, with the proviso that there is at least one radical A per molecule and the o units (SiR$_2$O) and the m units (SiRAO) can be distributed randomly in the molecule.

Aminoorganopolysiloxane (A) preferably has a fluorine content of from 2 to 50% by weight, with particular preference from 5 to 45% by weight.

The fluoroorganomodified aminoorganopolysiloxanes which are solid at room temperature and used in accordance with the invention are prepared by analogy with the process described, for example, in DE 196 34 832 A1. In the process described therein, the component containing fluoro groups is subjected to an addition reaction with the organopolysiloxane containing amino groups.

The aminoorganopolysiloxane (A) is preferably prepared using an organopolysiloxane which contains amino groups or sulfhydryl groups and has units of the general formula (V)

$$E_a R_b SiX_c O_{(4-a-b-c)/2} \quad (V),$$

where R, X, a, b and c have the definition stated above for them and E is a radical $-R^5-(NR^6-CH_2-CH_2)_d-NR^6{}_2$ (VI) or $-R^7-SH$ (VII), in which $R^5$ and $R^7$ in each case independently of one another are divalent, unsubstituted or substituted hydrocarbon radicals having 1 to 12 carbon atoms, $R^6$ has a definition stated above for $R^1$, d is 0 or an integer from 1 to 8, and in the general formula (VI) at least one radical $R^6$ has the definition of hydrogen atom, with the proviso that there is at least one unit of the general formula E per molecule,
which is reacted with fluorocarbons of the general formula VIII $$CH_2=\overset{R^8}{\underset{|}{C}}-\overset{O}{\underset{\|}{C}}-Z-R^9{}_k-C_nF_{2n+1}, \quad (VIII)$$

where
$R^8$ is a hydrogen atom or a methyl group, Z is a radical $-O-$ or $-NR^3-$ where $R^3$ is as defined above,
k is 0 or 1, preferably 1,
$R^9$ is a divalent, unsubstituted or substituted hydrocarbon radical having 1 to 12 carbon atoms, and n has the definition stated above for it. The reaction can be carried out in bulk, solution or emulsion.

Examples of radicals $R^5$ and $R^7$ are linear or branched alkylene radicals, such as for instance the 1,2-ethylene, 1,3-propylene, 1,2-propylene, 1,3-(2-methylpropylene) and dimethylmethylene radical. $R^1$ and $R^7$ are preferably the 1,3-propylene radical.

In formula (VI) the radicals E are preferably $-(CH_2)_3NH_2$, $-(CH_2)_3NH\text{-cyclo-}C_6H_{11}$, $-(CH_2)_3-NH-CH_2-CH_2-NH_2$, and $-(CH_2)_3-NH-CH_2-CH_2-N(C_2H_5)_2$, particular preference being given to $-(CH_2)_3-NH_2$ and $-(CH_2)_3-NH-CH_2-CH_2-NH_2$.

In formula (VII) the radicals E are preferably $-(CH_2)_3-SH$

The radical E preferably comprises radicals of the formula (VI).

Examples of radical $R^9$ are linear or branched alkylene radicals such as the 1,2-ethylene, 1,3-propylene, 1,2-propylene, 1,3-(2-methylpropylene) and dimethylmethylene radicals, and radicals substituted by $-SO_2NR^3-$, such as the radical $-CH_2-CH_2-N(C_4H_9)SO_2-$. $R^9$ is preferably the 1,2-ethylene radical or the radical $-CH_2-CH_2-N(C_4H_9)SO_2-$.

Radical Z is preferably the radical $-O-$.

The organosilicon compounds used in the process are preferably those of the general formula IX $$E_h R_{3-h} SiO(SiR_2O)_o(SiREO)_m SiR_{3-h} E_h \quad (IX),$$

where R, E, h, o and m have the definitions stated for them previously.

The organosilicon compounds used are, with particular preference, waxlike organopolysiloxanes having pendant and/or terminal 3-amino-n-propyl or N-(2-aminoethyl)-3-amino-n-propyl groups with amine numbers of from 0.1 to 5.

The fluorocarbons of the general formula (VIII) used are preferably $CH_2=CH-CO-O-CH_2-CH_2-C_6F_{13}$, $CH_2=CH-CO-O-CH_2-CH_2-C_{8-10}F_{17-21}$, $CH_2=CH-CO-O-CH_2-CH_2-C_{8-12}F_{17-25}$, $CH_2=CH-CO-O-CH_2-CH_2-N(C_4H_9)SO_2C_8F_{17}$, $CH_2=CH-CO-O-CH_2-CH_2-C_{10-20}F_{21-41}$, and $CH_2=C(CH_3)-CO-O-CH_2-CH_2-C_{6-10}F_{13-21}$.

The fluorocarbons of the general formula (VIII) used are, with particular preference, $CH_2=CH-CO-O-CH_2-CH_2-C_{8-10}F_{17-21}$, $CH_2=CH-CO-O-CH_2-CH_2-C_{8-12}F_{17-25}$, and $CH_2=CH-CO-O-CH_2-CH_2-N(C_4H_9)SO_2C_8F_{17}$.

The organosilicon compounds used, containing units of the general formula (V), and the fluorocarbons of the general formula (VIII), are commercial products and/or can be prepared by known chemical methods.

The aminoorganopolysiloxanes preferably have a viscosity at 60° C. from 10 to 1,000,000 mm²/s, more preferably from 20 to 100,000 mm²/s. At room temperature, i.e., at 20° C., the compounds in question are solids. The aminoorganopolysiloxanes can have a cyclic or linear structure. The amine content is preferably from 0.05 to 5.0% by weight.

The aminoorganopolysiloxane is heated together with the corresponding fluorinated (meth)acrylate, e.g., $CH_2=CH-CO-O-CH_2-CH_2-C_6F_{13}$, $CH_2=CH-CO-O-CH_2-CH_2-C_{8-10}F_{17-21}$, $CH_2=CH-CO-O-CH_2-CH_2-C_{8-12}F_{17-25}$, $CH_2=CH-CO-O-CH_2-CH_2-N(C_4H_9)SO_2C_8F_{17}$, $CH_2=CH-CO-O-CH_2-CH_2-C_{10-20}F_{21-41}$, or

CH$_2$=C(CH$_3$)—CO—O—CH$_2$—CH$_2$—C$_{6-10}$F$_{13-21}$, particular preference being given to

CH$_2$=CH—CO—O—CH$_2$—CH$_2$—C$_{8-10}$F$_{17-21}$,

CH$_2$=CH—CO—O—CH$_2$—CH$_2$—C$_{8-12}$F$_{17-25}$, and

CH$_2$=CH—CO—O—CH$_2$—CH$_2$—N(C$_4$H$_9$)SO$_2$C$_8$F$_{17}$, in an organic solvent, such as preferably toluene or isopropanol, to a temperature of from 60 to 120° C., more preferably from 70 to 80° C. The unsaturated compound containing fluoro groups is used preferably in amounts of from 0.1 to 90% by weight, more preferably in amounts of from 1 to 60% by weight, and, with particular preference, in amounts of from 5 to 40% by weight based on the weight of the reactive components.

In the process of the invention it is possible, although not preferred, to use all known compounds which catalyze Michael-analogous reactions, examples being glacial acetic acid, tin(IV) chloride, sodium methoxide and alkali metal amides.

It is also possible in the process of the invention to add free-radical initiators, such as azo compounds and/or peroxo compounds, as catalysts, although this is not preferred. If such catalysts are used, the amounts involved are preferably from 0.1 to 5% by weight, based on the overall weight of the reactive components.

Following reaction, the solvent is removed at a temperature of preferably at least 40° C. and not more than 120° C. and preferably under a pressure of from 100 to 150 mbar, and the reaction residue which remains is heated at a temperature of from 80 to 90° C., preferably under a pressure of 20 mbar for 1.5 h, the end product being obtained in an amount of from 85 to 99% by weight of the calculated theoretical yield.

The organopolysiloxanes solid at room temperature and comprising units of the general formula (I) are preferably organopolysiloxanes comprising (RSiO$_{3/2}$) units and organopolysiloxanes comprising (R$_3$SiO$_{1/2}$) and (SiO$_{4/2}$) units where R is as defined above.

Preferably from 10 to 50% by weight, more preferably from 25 to 50% by weight, and most preferably from 35 to 50% by weight, of the radicals R in the organopolysiloxane of the formula (II) are hydrocarbon radicals having at least 18 carbon atoms. Owing to the greater ease of availability, the remaining radicals are preferably methyl radicals.

Examples of the organopolysiloxanes of the general formula (IV) which are used and which are solid at room temperature are Me$_3$SiO[MeSi(n-C$_{18}$H$_{37}$)O]$_m$
  [MeSi{CH$_2$CH$_2$CH$_2$NHCH$_2$CH$_2$N(CH$_2$CH$_2$C(O)—O—CH$_2$CH$_2$C$_6$F$_{13}$)$_2$}O]$_2$SiMe$_3$,
Me$_3$SiO[MeSi(n-C$_{18}$H$_{37}$)O]$_m$
  [MeSi{CH$_2$CH$_2$CH$_2$NHCH$_2$CH$_2$N(CH$_2$CH$_2$C(O)—O—CH$_2$CH$_2$C$_{8-10}$F$_{17-21}$)$_2$}O]$_2$SiMe$_3$,
Me$_3$SiO[MeSi(n-C$_{18}$H$_{37}$)O]$_m$
  [MeSi{CH$_2$CH$_2$CH$_2$NHCH$_2$CH$_2$N(CH$_2$CH$_2$C(O)—O—CH$_2$CH$_2$C$_{8-12}$F$_{17-25}$)$_2$}O]$_2$SiMe$_3$,
Me$_3$SiO[MeSi(n-C$_{18}$H$_{37}$)O]$_m$
  [MeSi{CH$_2$CH$_2$CH$_2$NHCH$_2$CH$_2$N(CH$_2$CH$_2$C(O)—O—CH$_2$CH$_2$N(C$_4$H$_9$)SO$_2$C$_8$F$_{17}$)$_2$}O]$_2$SiMe$_3$,
Me$_3$SiO[MeSi(n-C$_{18}$H$_{37}$)O]$_m$
  [MeSi{CH$_2$CH$_2$CH$_2$NHCH$_2$CH$_2$N(CH$_2$CH$_2$C(O)—O—CH$_2$CH$_2$C$_{10-20}$F$_{21-41}$)$_2$}O]$_2$SiMe$_3$,
Me$_3$SiO[MeSi(n-C$_{18}$H$_{37}$)O]$_m$
  [MeSi{CH$_2$CH$_2$CH$_2$NHCH$_2$CH$_2$N(CH$_2$CH(CH$_3$)C(O)—O—CH$_2$CH$_2$C$_{6-10}$F$_{13-21}$)$_2$}O]$_2$SiMe$_3$, and
Me$_3$SiO[MeSi(n-C$_{18}$H$_{37}$)O]$_m$[MeSi{CH$_2$CH$_2$CH$_2$—S—CH$_2$CH$_2$C(O)—O—CH$_2$CH$_2$C$_{8-10}$F$_{17-21}$}O]$_2$SiMe$_3$, where m is preferably an integer from 10 to 150, more preferably from 20 to 120, and most preferably from 40 to 90, and z can be an integer from 0 to 30, preferably from 0 to 20, and most preferably from 1 to 12, preference being given to a ratio of m to z of from 30:1 to 1:1 more preferably 19:1 to 4:1.

The organopolysiloxanes of the general formula (IV) which are solid at room temperature and contain fluoro groups are preferably Me$_3$SiO[MeSi(n-C$_{18}$H$_{37}$)O]$_m$
  [MeSi{CH$_2$CH$_2$CH$_2$NHCH$_2$CH$_2$N(CH$_2$CH$_2$C(O)—O—CH$_2$CH$_2$C$_{8-10}$F$_{17-21}$)$_2$}O]$_2$SiMe$_3$,
Me$_3$SiO[MeSi(n-C$_{18}$H$_{37}$)O]$_m$
  [MeSi{CH$_2$CH$_2$CH$_2$NHCH$_2$CH$_2$N(CH$_2$CH$_2$C(O)—O—CH$_2$CH$_2$C$_{8-12}$F$_{17-25}$)$_2$}O]$_2$SiMe$_3$, and
Me$_3$SiO[MeSi(n-C$_{18}$H$_{37}$)O]$_m$
  [MeSi{CH$_2$CH$_2$CH$_2$NHCH$_2$CH$_2$N(CH$_2$CH$_2$C(O)—O—CH$_2$CH$_2$N(C$_4$H$_9$)SO$_2$C$_8$F$_{17}$)$_2$}O]$_2$SiMe$_3$.

Aminoorganopolysiloxanes (A) of the general formula (I) have number average molecular weights of preferably at least 1000, more preferably from 10,000 to 30,000. The aminoorganopolysiloxanes (A) of the general formula (IV) preferably have a waxlike consistency and a melting point of from 25 to 60° C.

The polishes of the invention are prepared with particular preference using organopolysiloxanes which are solid at room temperature and comprise units of the formula (I) or organopolysiloxanes of the formula (IV) which are solid at room temperature, or mixtures thereof.

To prepare the polishes of the invention, aminoorganopolysiloxane (A) is used in amounts of preferably from 0.1 to 5.0% by weight, with particular preference from 0.5 to 2.0% by weight, based in each case on the overall weight of the polish of the invention.

To prepare the polishes of the invention, aminoorganopolysiloxanes (A) are used preferably in the form of an aqueous emulsion. Also possible, however, is the use of the polishes of the invention in solvent-based systems.

If aminoorganopolysiloxane (A) comprising units of the formula (I) is used to prepare the polishes of the invention, the emulsion is preferably prepared by emulsifying the aminoorganopolysiloxane (A) comprising units of the formula (I) in water with an emulsifier. The emulsification of the aminoorganopolysiloxane (A) can be carried out in customary mixers suitable for preparing emulsions.

In the preparation of the aqueous emulsions, the emulsifiers used can be all ionic and nonionic emulsifiers, both as individual emulsifiers and mixtures of emulsifiers with which it is possible to prepare stable aqueous emulsions of organopolysiloxanes. It is also possible to use emulsifiers such as are described in DE 36 13 384 C. Preference is given to the use of nonionic and cationic emulsifiers, with particular preference given in this context to the use of fatty alcohol polyglycol ethers, nonylphenol polyglycol ethers, tri-n-butylphenol polyglycol ethers, and quaternary ammonium salts of saturated and unsaturated fatty acids.

The aqueous emulsions of aminoorganopolysiloxane (A) preferably contain emulsifier in amounts of preferably from 2 to 8% by weight, more preferably from 3 to 5% by weight, based in each case on the overall weight of aminoorganopolysiloxane (A).

The aqueous emulsions of aminoorganopolysiloxane (A) possess a solids content of preferably from 10 to 60% by weight, in particular from 15 to 42% by weight, based in each case on the overall weight of the emulsion.

The temperature required to melt aminoorganopolysiloxane (A) depends on the organopolysiloxane used and is preferably from 20 to 60° C., with particular preference from 40 to 50° C. The emulsification of the melt is carried out in accordance with the technique customary in silicon chemistry.

The aminoorganopolysiloxanes (A) can also be dissolved in organic solvents and used as polishes with or without the addition of suitable additives, which are exemplified later. Examples of organic solvents are petroleum spirits. Solutions containing preferably from 0.1 to 20% by weight, more preferably from 0.1 to 10% by weight and especially from 0.1 to 5% by weight of aminoorganopolysiloxane (A) are prepared.

Depending on the intended use, the polish of the invention can comprise additives such as, for example, nonsilicon waxes, thickeners, abrasives, preservatives and additives, and also, if desired, further silicones and/or emulsions thereof.

Examples of nonsilicon waxes are natural waxes of vegetable origin, such as carnauba wax and candelilla wax, montanic acid and montanic ester waxes, partially oxidized synthetic paraffins, polyethylene waxes, polyvinyl ether waxes, and wax containing metal soaps, of which carnauba wax, paraffin waxes and polyethylene waxes are preferred and paraffin waxes are particularly preferred.

If waxes are used to prepare the polish of the invention, they are used preferably in amounts of from 0.1 to 5.0% by weight, with particular preference from 0.1 to 1.0% by weight, based in each case on the overall weight of the polish.

Examples of thickeners are homopolysaccharides, heteropolysaccharides, polyacrylates, carboxy- and hydroxymethylcelluloses, with preference being given to polysaccharides and polyacrylates most preferably to polyacrylates. If thickeners are used to prepare the polish of the invention, they are used preferably in amounts of from 0.1 to 1.5% by weight, with particular preference from 0.3 to 0.6% by weight, based in each case on the overall weight of the polish.

Examples of abrasives are polishing clay, so-called siliceous chalk, pyrogenic silica and natural kieselguhr, such as, for example, "Snow Floss" from Lehmann & Foss, particular preference being given to siliceous chalk and polishing clay. If abrasives are used to prepare the polish of the invention, they are used preferably in amounts of from 1 to 10% by weight, with particular preference of from 3 to 5% by weight, based on the overall weight of the polish.

Examples of preservatives are formaldehyde, parabens, benzyl alcohol, salicylic acid and salts thereof, benzoic acid and salts thereof, and also isothiazolinones, preference being given to formaldehyde and isothiazolinones with particular preference given to formaldehyde. If preservatives are used for preparing the polish of the invention, they are used preferably in amounts of from 0.01 to 0.30% by weight, more preferably from 0.05 to 0.10% by weight, based on the overall weight of the polish.

Examples of additives are fragrances, UV absorbers, antifreeze agents, anticorrosives, antioxidants, and colorants. If additives are used to prepare the polish of the invention, they are preferably used individually in amounts of from 0.01 to 0.50% by weight, especially from 0.05 to 0.50% by weight, based on the overall weight of the polish.

From each of the groups of substances mentioned above as possible components of the aqueous polishes of the invention it is possible to use a single component from the group or a mixture of at least two different such substances.

The polishes of the invention contain water, preferably in amounts of from 85 to 99.9% by weight, with particular preference from 93 to 99.5% by weight, based on the overall weight of the polish, preference being given to the use of demineralized water.

The individual components of the polish of the invention can be mixed with one another in any desired manner. Thus, for example, the additives can be admixed with the aminoorganopolysiloxane (A) before the emulsifying step. Alternatively, the additives can be mixed with the finished emulsions of amino-organopolysiloxane (A) and, if desired, organopolysiloxanes which are liquid at room temperature, which is preferred.

The emulsifying and mixing of the components which can be used to prepare the polishes of the invention is preferably carried out at a temperature of from 20 to 50° C. and the pressure of the surrounding atmosphere, i.e., from 900 to 1100 hPa. However, it is also possible to employ higher or lower temperatures and also higher or lower pressures. The emulsifying step can take place in conventional mixers suitable for preparing emulsions, such as high-speed stator-rotor stirrers of the Prof. P. Willems type, as are known under the registered trademark "Ultra-Turrax".

The room temperature consistency of the polishes of the invention ranges from that of a thin liquid to that of a creamy paste. The polishes of the invention have a good emulsion stability of at least two years when stored properly at room temperature.

The present invention further provides a method for the care of hard or soft, impervious or porous surfaces, in which the polish of the invention is applied to the hard or soft, impervious or porous surfaces. In the method of the invention, the polish of the invention is applied by spraying, by dipping or by using an auxiliary means such as cotton wool, textiles and sponges, and rubbed in. The polish of the invention has the advantage that it is easy to apply and rubs in well.

The surfaces to be treated are preferably metallic or painted surfaces, plastics surfaces, or surfaces of textile sheetlike structures, leather, wood, glass, glass ceramic, metal, cork, laminate or stone. Examples are automobile bodies, glass ceramic hobs, floor coverings of all kinds, articles of wood, furniture and erected structures made of wood, articles made of stone, and leather, cork or textile articles.

In accordance with the abovementioned applications, the compositions or formulations of the invention can also be used as antifoams, for textile treatment, or in the cosmetics sector as conditioners. The polishes of the invention have the advantage that they need not contain any organic solvent or else organic solvent only in extremely small amounts, for example as a preservative, but can also be solvent-based. Furthermore, they have the advantage that excellent weathering stability and wash resistance is obtained with the polishes of the invention owing to their waxlike character. In order to achieve this effect, even small amounts of room-temperature-solid organopolysiloxanes are sufficient for preparing the polishes of the invention.

In addition, the polishes of the invention have the advantage of excellent resistance to oils, fats and solvents. This is particularly important in the case of surfaces exposed to heavy contamination by oily soot, from internal combustion engines, for example, or exposed to direct contact with solvents, e.g., on the gas-tank filling pipe of motor vehicles.

Furthermore, the polishes of the invention have the advantage that they are nonflammable (if water-based), easy to apply and give the treated solid surfaces high depth of color and gloss.

Further advantages in connection with the preparation of the polishes of the invention arise through the increased gloss effect using the waxlike amino-organopolysiloxanes (A), which offers additional advantages for the resultant polishes.

The waxlike aminoorganopolysiloxanes (A) used in accordance with the invention combine the advantages of the pure waxes, which exhibit hydrophobic properties but no oleophobic properties, with those of fluoro compounds, which additionally possess oleophobic properties.

In the examples described below, all parts and percentages given are by weight unless specified otherwise. Furthermore, all viscosities refer to a temperature of 25° C. or 60° C. Unless specified otherwise, the examples below were carried out under the pressure of the surrounding atmosphere, i.e., at about 1000 hPa, and at room temperature, i.e., at about 20° C., or at a temperature which is established upon combining the reactants without additional heating or cooling.

The contact angle measurements are carried out as follows:

A drop of water having a volume of 0.01 ml is applied to the surface to be tested, from a height of 15 mm, and the contact angle is determined with the aid of a goniometer (type 100-10 from Rame-Hart Inc., New Jersey, USA). The measurement is repeated four times and the mean value of the 5 measurements is calculated. The blank value in the text below is the contact angle measurement on the substrate untreated with polish of the invention.

The following abbreviations are used: Me, methyl radical; AN, amine number.

EXAMPLE 1

A mixture of 30 g (9 mmol of primary amine) of aminoorganopolysiloxane (AN=0.6) and 3.02 g (7.2 mmol) of fluoroacrylate of the formula $CH_2=CH—CO—O—(CH_2)_2—C_6F_{13}$ in 40 g of isopropanol was heated to 70–80° C. and stirred for 4 hours. Subsequently, the reaction mixture was filtered while still hot and the isopropanol was distilled off under a pressure of from 100 to 150 mbar and at a liquid-phase temperature of at least 40° C. and not more than 120° C. Subsequently, the reaction mixture was heated under a pressure of 20 mbar and at a liquid-phase temperature of from 80 to 90° C. for 1.5 hours in order to remove the volatile constituents. This gave 29.2 g of a white wax (88.4% of theory).

EXAMPLE 2

A mixture of 30 g (9 mmol of primary amine) of aminoorganopolysiloxane (AN=0.6) and 4.10 g (7.2 mmol) of fluoroacrylate Zonyl® TA-N (Du Pont) in 40 g of isopropanol was heated to 70–80° C. and stirred for 4 hours. Subsequently, the reaction mixture was filtered while still hot and the isopropanol was distilled off under a pressure of from 100 to 150 mbar and at a liquid-phase temperature of at least 40° C. and not more than 120° C. Subsequently, the reaction mixture was heated under a pressure of 20 mbar and at a liquid-phase temperature of from 80 to 90° C. for 1.5 hours in order to remove the volatile constituents. This gave 30.3 g of a white wax (88.9% of theory).

EXAMPLE 3

A mixture of 30 g (3 mmol of primary amine) of aminoorganopolysiloxane (AN=0.2) and 2.74 g (4.8 mmol) of fluoroacrylate Zonyl® TA-N (Du Pont) in 40 g of isopropanol was heated to 70–80° C. and stirred for 4 hours. Subsequently, the reaction mixture was filtered while still hot and the isopropanol was distilled off under a pressure of from 100 to 150 mbar and at a liquid-phase temperature of at least 40° C. and not more than 120° C. Subsequently, the reaction mixture was heated under a pressure of 20 mbar and at a liquid-phase temperature of from 80 to 90° C. for 1.5 hours in order to remove the volatile constituents. This gave 28.3 g of a white wax (86.5% of theory).

EXAMPLE 4

(Wax B)

A mixture of 30 g (9 mmol of primary amine) of aminoorganopolysiloxane (AN=0.6) and 8.21 g (14.4 mmol) of fluoroacrylate Zonyl® TA-N (Du Pont) in 40 g of isopropanol was heated to 70–80° C. and stirred for 4 hours. Subsequently, the reaction mixture was filtered while still hot and the isopropanol was distilled off under a pressure of from 100 to 150 mbar and at a liquid-phase temperature of at least 40° C. and not more than 120° C. Subsequently, the reaction mixture was heated under a pressure of 20 mbar and at a liquid-phase temperature of from 80 to 90° C. for 1.5 hours in order to remove the volatile constituents. This gave 33.9 g of a white wax (88.7% of theory).

EXAMPLE 5

A mixture of 30 g (15 mmol of primary amine) of aminoorganopolysiloxane (AN=1.0) and 13.68 g (24.0 mmol) of fluoroacrylate Zonyl® TA-N (Du Pont) in 40 g of isopropanol was heated to 70–80° C. and stirred for 4 hours. Subsequently, the reaction mixture was filtered while still hot and the isopropanol was distilled off under a pressure of from 100 to 150 mbar and at a liquid-phase temperature of at least 40° C. and not more than 120° C. Subsequently, the reaction mixture was heated under a pressure of 20 mbar and at a liquid-phase temperature of from 80 to 90° C. for 1.5 hours in order to remove the volatile constituents. This gave 37.9 g of a white wax (86.8% of theory).

EXAMPLE 6

(Wax D)

A mixture of 30 g (22.5 nmuol of primary amine) of aminoorganopolysiloxane (AN=1.5) and 20.52 g (36.0 mmol) of fluoroacrylate Zonyl® TA-N (Du Pont) in 40 g of isopropanol was heated to 70–80° C. and stirred for 4 hours. Subsequently, the reaction mixture was filtered while still hot and the isopropanol was distilled off under a pressure of from 100 to 150 mbar and at a liquid-phase temperature of at least 40° C. and not more than 120° C. Subsequently, the reaction mixture was heated under a pressure of 20 mbar and at a liquid-phase temperature of from 80 to 90° C. for 1.5 hours in order to remove the volatile constituents. This gave 44.4 g of a white wax (87.9% of theory).

EXAMPLE 7

A mixture of 30 g (9 mmol of primary amine) of aminoorganopolysiloxane (AN=0.6) and 10.26 g (18.0 mmol) of fluoroacrylate Zonyl® TA-N (Du Pont) in 40 g of isopropanol was heated to 70–80° C. and stirred for 4 hours. Subsequently, the reaction mixture was filtered while still hot and the isopropanol was distilled off under a pressure of from 100 to 150 mbar and at a liquid-phase temperature of at least 40° C. and not more than 120° C. Subsequently, the reaction mixture was heated under a pressure of 20 mbar and at a liquid-phase temperature of from 80 to 90° C. for 1.5 hours in order to remove the volatile constituents. This gave 36.0 g of a white wax (89.4% of theory).

EXAMPLE 8

(Wax A)

A mixture of 30 g (3 mmol of primary amine) of aminoorganopolysiloxane (AN=0.2) and 2.54 g (4.8 mmol) of fluoroacrylate Fluowet® AC 812 (Clariant GmbH) in 40 g of isopropanol was heated to 70–80° C. and stirred for 4 hours. Subsequently, the reaction mixture was filtered while still hot and the isopropanol was distilled off under a pressure of from 100 to 150 mbar and at a liquid-phase temperature of at least 40° C. and not more than 120° C. Subsequently, the reaction mixture was heated under a pressure of 20 mbar and at a liquid-phase temperature of from 80 to 90° C. for 1.5 hours in order to remove the volatile constituents. This gave 28.2 g of a white wax (86.7% of theory).

EXAMPLE 9

(Wax C)

A mixture of 30 g (15 mmol of primary amine) of aminoorganopolysiloxane (AN=1.0) and 12.72 g (24.0 mmol) of fluoroacrylate Fluowet® AC 812 (Clariant GmbH) in 40 g of isopropanol was heated to 70–80° C. and stirred for 4 hours. Subsequently, the reaction mixture was filtered while still hot and the isopropanol was distilled off under a pressure of from 100 to 150 mbar and at a liquid-phase temperature of at least 40° C. and not more than 120° C. Subsequently, the reaction mixture was heated under a pressure of 20 mbar and at a liquid-phase temperature of from 80 to 90° C. for 1.5 hours in order to remove the volatile constituents. This gave 37.1 g of a white wax (87.0% of theory).

EXAMPLE 10

A mixture of 30 g (9 mmol of primary amine) of aminoorganopolysiloxane (AN=0.6) and 3.82 g (7.2 mmol) of fluoroacrylate Fluowet® AC 812 (Clariant GmbH) in 40 g of isopropanol was heated to 70–80° C. and stirred for 4 hours. Subsequently, the reaction mixture was filtered while still hot and the isopropanol was distilled off under a pressure of from 100 to 150 mbar and at a liquid-phase temperature of at least 40° C. and not more than 120° C. Subsequently, the reaction mixture was heated under a pressure of 20 mbar and at a liquid-phase temperature of from 80 to 90° C. for 1.5 hours in order to remove the volatile constituents. This gave 30.3 g of a white wax (89.6% of theory).

EXAMPLE 11

A mixture of 30 g (9 mmol of primary amine) of aminoorganopolysiloxane (AN=0.6) and 4.70 g (7.2 mmol) of fluoroacrylate Fluorad® FX 189 (3M) in 40 g of isopropanol was heated to 70–80° C. and stirred for 4 hours. Subsequently, the reaction mixture was filtered while still hot and the isopropanol was distilled off under a pressure of from 100 to 150 mbar and at a liquid-phase temperature of at least 40° C. and not more than 120° C. Subsequently, the reaction mixture was heated under a pressure of 20 mbar and at a liquid-phase temperature of from 80 to 90° C. for 1.5 hours in order to remove the volatile constituents. This gave 32.6 g of a white wax (93.9% of theory).

EXAMPLE 12

A mixture of 30 g (9 mmol of primary amine) of aminoorganopolysiloxane (AN=0.6) and 4.39 g (7.2 mmol) of fluoroacrylate Fluowet® AC 61020 (Clariant GmbH) in 40 g of isopropanol was heated to 70–80° C. and stirred for 4 hours. Subsequently, the reaction mixture was filtered while still hot and the isopropanol was distilled off under a pressure of from 100 to 150 mbar and at a liquid-phase temperature of at least 40° C. and not more than 120° C. Subsequently, the reaction mixture was heated under a pressure of 20 mbar and at a liquid-phase temperature of from 80 to 90° C. for 1.5 hours in order to remove the volatile constituents. This gave 29.9 g of a white wax (86.9% of theory).

EXAMPLE 13

A mixture of 30 g (9 mmol of primary amine) of aminoorganopolysiloxane (AN=0.6) and 3.82 g (7.2 mmol) of fluoromethacrylate Zonyl® TM (Du Pont) in 40 g of isopropanol was heated to 70–80° C. and stirred for 4 hours. Subsequently, the reaction mixture was filtered while still hot and the isopropanol was distilled off under a pressure of from 100 to 150 mbar and at a liquid-phase temperature of at least 40° C. and not more than 120° C. Subsequently, the reaction mixture was heated under a pressure of 20 mbar and at a liquid-phase temperature of from 80 to 90° C. for 1.5 hours in order to remove the volatile constituents. This gave 29.9 g of a white wax (88.4% of theory).

EXAMPLE 14

A mixture of 30 g (8.8 mmol of mercapto) of mercaptoorganopolysiloxane and 4.00 g (7.0 mmol) of fluoroacrylate Zonyl® TA-N (Du Pont) and 0.24 g (1.5 mmol) of azoisobutyronitrile in 40 g of isopropanol was heated to 70–80° C. and stirred for 4 hours. Subsequently, the reaction mixture was filtered while still hot and the isopropanol was distilled off under a pressure of from 100 to 150 mbar and at a liquid-phase temperature of at least 40° C. and not more than 120° C. Subsequently, the reaction mixture was heated under a pressure of 20 mbar and at a liquid-phase temperature of from 80 to 90° C. for 1.5 hours in order to remove the volatile constituents. This gave 31.9 g of a white wax (93.8% of theory).

Waxes Used

Wax A (cf. Example 8): Amine wax (AN=0.2) with Fluowet® AC 812 (1:1.6)

Wax B (cf. Example 4): Amine wax (AN=0.6) with Zonyl® TA-N (1:1.6)

Wax C (cf. Example 9): Amine wax (AN=1.0) with Fluowet® AC 812 (1:1.6)

Wax D (cf. Example 6): Amine wax (AN=1.5) with Zonyl® TA-N (1:1.6)

Reference substance oil A: Fluoro oil AF 98/300 (Viscosity at 25° C.: 300 mm$^2$/s; fluorine content: approx. 36.5% by weight)

Spirit Formulation/Testing of Hydrophobicization

Waxes A–D are dissolved 2% strength in petroleum spirit 100/140°, and the oil A 2% strength in acetone, and the solutions are applied using cotton wool to painted metal panels of a motor vehicle body having a contact angle of 66° with respect to water, and are rubbed in. After leaving them to stand for 15 minutes at room temperature, the contact angles of the treated surfaces with respect to water are measured and then the substrates are sprinkled from a distance of 20 cm with in each case 10 l per 100 cm$^2$ of surface area of tap water having a temperature of approximately 6° C., this operation being carried out 4 times for 15 minutes at room temperature. The result of the contact angle measurements is given in Table 1.

TABLE 1

| Duration of sprinkling [min] | Oil A (contact angle) | Wax A (contact angle) | Wax B (contact angle) | Wax C (contact angle) | Wax D (contact angle) |
| --- | --- | --- | --- | --- | --- |
| 0 | 78 | 95 | 101 | 95 | 104 |
| 15 | 73 | 95 | 78 | 87 | 98 |
| 30 | 73 | 93 | 70 | 81 | 91 |
| 45 | 71 | 91 | 69 | 74 | 82 |
| 60 | 68 | 91 | 68 | 72 | 76 |

In terms of their time-dependent hydrophobicizing action at room temperature, the polishes of the invention containing aminoorganopolysiloxanes (A) are markedly superior to liquid organopolysiloxanes containing fluoro groups.

Spirit Formulation/Testing of Oleophobicization

Waxes A–D are dissolved 2% strength in petroleum spirit 100/140°, and the oil A 2% strength in acetone, and the solutions are applied using cotton wool to painted metal panels of a motor vehicle body having a contact angle of 20° with respect to liquid paraffin, and are rubbed in. After leaving them to stand for 15 minutes at room temperature, the contact angles of the treated surfaces with respect to liquid paraffin are measured. The results are listed in Table 2:

TABLE 2

| Oil A (contact angle) | Wax A (contact angle) | Wax B (contact angle) | Wax C (contact angle) | Wax D (contact angle) |
| --- | --- | --- | --- | --- |
| 46 | 44 | 54 | 65 | 63 |

In terms of their oleophobicizing effect at room temperature, the polishes of the invention containing aminoorganopolysiloxanes (A) are equal to or markedly better than liquid organopolysiloxanes containing fluoro groups.

Aqueous/Spirit Formulation

Formulation A 0.3 g of polyacrylic acid (commercially available under the designation Carbopol® from Goodrich, Neuss (DE)) is dispersed with stirring in 68.4 g of deionized water, after which a mixture of 3 g of oil A, 0.75 g of a dimethylpolysiloxane which is terminated with trimethylsiloxy units and has a viscosity of 350 mm²/s (commercially available under the designation "AK 350" from Wacker-Chemie GmbH, Munich (DE)), 0.25 g of a dimethylpolysiloxane which is terminated with trimethylsiloxy units and has a viscosity of 12,500 mm²/s (commercially available under the designation "AK 12500" from Wacker-Chemie GmbH, Munich (DE)), 5 g of mineral spirit of boiling range 100/140° C., 10 g of Shellsol® T (commercially available from Deutsche Shell GmbH, Frankfurt (DE)) and 2 g of oleic acid is stirred in, followed by the slow metered addition in succession of 10.0 g of abrasive (commercially available under the designation "Sillitin® N 85" from Hoffmann Mineral, Neuberg (DE)), 0.2 g of triethanolamiine, 1.0 g of diethylaminoethanol and 0.1 g of 40% strength formalin solution.

Formulation B 0.3 g of polyacrylic acid (commercially available under the designation Carbopol® from Goodrich, Neuss (DE)) is dispersed with stirring in 68.4 g of deionized water, after which a mixture of 3 g of wax D, 0.75 g of a dimethylpolysiloxane which is terminated with trimethylsiloxy units and has a viscosity of 350 mm²/s (commercially available under the designation "AK 350" from Wacker-Chemie GmbH, Munich (DE)), 0.25 g of a dimethylpolysiloxane which is terminated with trimethylsiloxy units and has a viscosity of 12,500 mm²/s (commercially available under the designation "AK 12500" from Wacker-Chemie GmbH, Munich (DE)), 5 g of mineral spirit of boiling range 100/140° C., 10 g of Shellsol® T (commercially available from Deutsche Shell GmbH, Frankfurt (DE)) and 2 g of oleic acid is stirred in, followed by the slow metered addition in succession of 10.0 g of abrasive (commercially available under the designation "Sillitin® N 85" from Hoffmann Mineral, Neuberg (DE)), 0.2 g of triethanolamine, 1.0 g of diethylaminoethanol and 0.1 g of 40% strength formalin solution.

The hydrophobicizing agents thus obtained are applied using cotton wool to the metal panel of a motor vehicle body having a contact angle of 66° with respect to water, and are rubbed in. After leaving them to stand for 15 minutes at room temperature, the contact angle with respect to water is measured and subsequently the metal panel is sprinkled from a distance of 20 cm with in each case 10 l per 100 cm² of surface area of tap water having a temperature of about 6° C., this operation being carried out 4 times for 15 minutes at room temperature. The result of the contact angle measurements with respect to water is given in Table 3.

TABLE 3

| Duration of sprinkling [min] | Formulation A (contact angle) | Formulation B (contact angle) |
| --- | --- | --- |
| 0 | 71 | 97 |
| 15 | 70 | 99 |
| 30 | 68 | 98 |
| 45 | 68 | 98 |
| 60 | 68 | 97 |

In ready-to-use formulations as well, in terms of their time-dependent hydrophobicizing action at room temperature, the polishes of the invention containing aminoorganopolysiloxanes (A) are markedly superior to liquid organopolysiloxanes containing fluoro groups.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A polish for surfaces, comprising at least one aminoorganopolysiloxane (A) which is solid at room temperature, contains fluoro groups, is able to change its aggregate state reversibly as a result of changes in temperature, contains at least one aminoorgano group per molecule, and has a liquidity point or melting point between 20° C. and 60° C.

2. A polish for surfaces, comprising at least one aminoorganopolysiloxane (A) which is solid at room temperature, contains fluoro groups is able to change its aggregate state reversibly as a result of changes in temperature wherein said aminoorganopolysiloxane (A) comprises units of the general formula I $$A_a R_b SiX_c O_{(4-a-b-c)/2} \tag{I},$$

where

R are independently monovalent, optionally substituted hydrocarbon radicals having 1 to 40 carbon atoms, X are independently chlorine or a radical of the formula —OR¹ where R¹ is hydrogen or an alkyl radical having 1 to 8 carbon atoms, optionally substituted by ether oxygen atoms, or X is a radical of the general formula II $$—R^2\{[CH(CH_3)CH_2O]_e[CH_2CH_2O]_f[(CH_2)_4O]_gR^3\}_{y-1} \quad (II),$$

where

R² is a divalent, trivalent or tetravalent hydrocarbon radical having 2 to 30 carbon atoms optionally interrupted by oxygen atoms and substituted by one or more groups of the formulae —C(O)—O—, —C(O)—NR³—, —SO₂—NR³—, —NR³—, —N= and —S— y in accordance with the valence of radical R² is 2, 3 or 4,

R³ is hydrogen or a hydrocarbon radical which has 1 to 40 carbon atoms and is optionally substituted by a group —C(O), and e, f and g independently of one another, are 0 or an integer from 1 to 200, with the proviso that the sum e+f+g is ≧1, A is a radical of the general formula III $$—R^4\{—C_nF_{2n+1}\}_{y-1} \quad (III),$$

where

R⁴ has the same definition as R², y in accordance with the valency of radical R⁴ is 2, 3 or 4 and n is a number from 1 to 40, a is 0, 1 or 2, b is 0, 1, 2 or 3, and c is 0, 1, 2 or 3, with the proviso that the sum a+b+c is ≦4, aminoorganopolysiloxane (A) has at least one radical A per molecule, contains at least one aminoorgano group per molecule, and has a liquidity point or melting point between 20° C. and 60° C.

3. The polish of claim 1, wherein said aminoorganopolysiloxanes (A) consists of units of the general formula (I).

4. The polish of claim 2, wherein said aminoorganopolysiloxanes (A) consists of units of the general formula (I).

5. The polish of claim 1, wherein the liquidity point or melting point of said aminoorganopolysiloxane (A) at 1000 hPa is from 40° C. to 50° C.

6. The polish of claim 2, wherein the liquidity point or melting point of said aminoorganopolysiloxane (A) at 1000 hPa is from 40° C. to 50° C.

7. The polish of claim 3, wherein the liquidity point or melting point of said aminoorganopolysiloxane (A) at 1000 hPa is from 40° C. to 50° C.

8. The polish of claim 2, wherein said aminoorganopolysiloxane (A) is used in amounts of from 0.1 to 5.0% by weight, based on the overall weight of the polish.

9. The polish of claim 5, wherein said aminoorganopolysiloxane (A) is used in amounts of from 0.1 to 5.0% by weight, based on the overall weight of the polish.

10. The polish of claim 2, wherein said aminoorganopolysiloxanes (A) are used in the form of an aqueous emulsion or dissolved in solvent.

11. A method for the polishing treatment of hard or soft, impervious or porous, surfaces, said method comprising applying the polish of claim 1 to the surface.

12. A method for the polishing treatment of hard or soft, impervious or porous, surfaces, said method comprising applying the polish of claim 2 to the surface.

13. A method for the polishing treatment of hard or soft, impervious or porous, surfaces, said method comprising applying the polish of claim 3 to the surface.

14. A method for the polishing treatment of hard or soft, impervious or porous, surfaces, said method comprising applying the polish of claim 5 to the surface.

15. A polish comprising at least one aminoorganopolysiloxane which is solid at room temperature, contains fluoro groups, and is able to change its aggregate state reversibly as a result of changes in temperature, said at least one aminoorganopolysiloxane having the formula $$E_hR_{3-h}SiO(SiR_2O)_o(SiREO)_mSiR_{3-h}E_h \quad (IX),$$

where h is 0, 1, or 2 m and o independently are 0 or an integer from 1 to 1000,

R is a monovalent, optionally substituted C₁₋₄₀ hydrocarbon radical,

E is a radical of the formula

—R⁵—(NR⁶—CH₂—CH₂)_d—NR⁶₂ wherein

R⁵ is a divalent, optionally substituted C₁₋₁₂ hydrocarbon radical,

R⁶ is hydrogen, methyl, ethyl, propyl, or butyl d is 0 or an integer from 1–8, wherein at least one R⁶ is H, and wherein said at least one aminoorganopolysiloxane contains at least one group E, and has a liquidity point or melting point between 20° C. and 60° C.

16. The polish of claim 15 wherein said at least one aminoorganopolysiloxane has a liquidity point or melting point of from 40° C. to 50° C.

17. The polish of claim 15 wherein at least one E is selected from the group consisting of

—(CH₂)₃NH₂,

—(CH₂)₃NH-cyclo-C₆H₁₁,

—(CH₂)₃—NH—CH₂—CH₂—NH₂, and

—(CH₂)₃—NH—CH₂—CH₂—N(C₂H₅)₂.

18. The polish of claim 17 wherein said at least one aminoorganopolysiloxane has a liquidity point or melting point between 40° C. and 50° C.

19. The polish of claim 15 further comprising a unit E of the formula —R⁷—SH, wherein R⁷ is a divalent, optionally substituted C₁₋₁₂ hydrocarbon radical.

* * * * *